US009836664B1

(12) United States Patent
Ramaswamy et al.

(10) Patent No.: US 9,836,664 B1
(45) Date of Patent: Dec. 5, 2017

(54) METHOD AND SYSTEM FOR IDENTIFYING AND ADDRESSING IMAGING ARTIFACTS TO ENABLE A SOFTWARE SYSTEM TO PROVIDE FINANCIAL SERVICES BASED ON AN IMAGE OF A FINANCIAL DOCUMENT

(71) Applicant: Intuit Inc., Mountain View, CA (US)

(72) Inventors: Pallavika Ramaswamy, Cupertino, CA (US); Richard J. Becker, St. Albert (CA); Daniel Leontin Moise, Edmonton (CA); Horace Chan, Edmonton (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/167,434

(22) Filed: May 27, 2016

(51) Int. Cl.
*G06K 9/00* (2006.01)
*G06K 9/34* (2006.01)
*G06K 9/18* (2006.01)
*G06Q 40/00* (2012.01)
*G06N 99/00* (2010.01)

(52) U.S. Cl.
CPC ......... *G06K 9/344* (2013.01); *G06K 9/00456* (2013.01); *G06K 9/18* (2013.01); *G06N 99/005* (2013.01); *G06Q 40/123* (2013.12)

(58) Field of Classification Search
CPC .......... G06K 9/344; G06K 9/18–9/186; G06K 9/00442–9/00483; G06K 9/0051; G06N 99/005; G06Q 40/12–40/128
See application file for complete search history.

(56) References Cited

U.S. PATENT DOCUMENTS

| 8,462,207 | B2 * | 6/2013 | Garcia | G01B 11/2513 348/135 |
| 8,472,754 | B1 * | 6/2013 | Harkness | H04N 19/86 358/1.2 |
| 9,412,017 | B1 * | 8/2016 | Huang | G06K 9/00449 |
| 9,558,521 | B1 * | 1/2017 | Eftekhari | G06Q 40/12 |
| 2002/0164084 | A1 * | 11/2002 | Baggs | G06T 5/20 382/275 |
| 2005/0089195 | A1 * | 4/2005 | Hu | G06T 5/002 382/107 |
| 2009/0185755 | A1 * | 7/2009 | Cho | H04N 5/23248 382/264 |

(Continued)

*Primary Examiner* — Aaron W Carter
(74) *Attorney, Agent, or Firm* — Hawley Troxell Ennis & Hawley LLP; Philip McKay

(57) ABSTRACT

A method and system identifies and addresses imaging artifacts in an image of a financial document to enable a software system to provide financial services based on the image of the financial document. The method and system receive document image data, extract image features from the document image data, and apply the image features to an analytics model to generate an image classification, according to one embodiment. The method and system use the image classification to determine whether the document image data contains one or more particular image artifacts (e.g., Moiré patterns), according to one embodiment. If the software system determines that it is likely that the document image data contains one or more particular image artifacts, then the software system applies a filter (e.g., a median filter) to the document image data to reduce and/or remove the one or more particular image artifacts, according to one embodiment.

33 Claims, 6 Drawing Sheets

(56) References Cited

U.S. PATENT DOCUMENTS

| | | | |
|---|---|---|---|
| 2010/0033633 A1* | 2/2010 | Dane | H04N 19/176 |
| | | | 348/625 |
| 2011/0243472 A1* | 10/2011 | Chang | G06T 5/002 |
| | | | 382/264 |
| 2012/0109792 A1* | 5/2012 | Eftekhari | G06F 21/31 |
| | | | 705/31 |
| 2014/0172656 A1* | 6/2014 | Shaw | G06Q 40/123 |
| | | | 705/31 |
| 2014/0241631 A1* | 8/2014 | Huang | G06K 9/00463 |
| | | | 382/176 |
| 2014/0244455 A1* | 8/2014 | Huang | G06Q 40/123 |
| | | | 705/31 |
| 2014/0244456 A1* | 8/2014 | Huang | G06Q 40/123 |
| | | | 705/31 |
| 2016/0044255 A1* | 2/2016 | Bewersdorf | G06T 5/20 |
| | | | 348/241 |
| 2016/0242854 A1* | 8/2016 | Grass | A61B 6/5252 |
| 2016/0321523 A1* | 11/2016 | Sen | G06T 5/002 |
| 2016/0350620 A1* | 12/2016 | Rao | G06K 9/6256 |
| 2017/0200235 A1* | 7/2017 | Sriram | G06Q 40/123 |

* cited by examiner

| | 200 | |
|---|---|---|
| 1 Wages, tips, other comp. 35489.55 | | 2 Federal income tax withhold 4660.50 |
| 3 Social security wages 35489.55 | | 4 Social security tax withhold 2200.35 |
| 5 Medicare wages and tips 35489.55 | | 6 Medicare tax withhold 514.60 |
| d Control number 428575 LOS2/7WP | Dept. 650412 | Corp. A | Employer use only 4297 |
| c Employer's name, address, andd ZIP code BIOMAT USA INC 2410 LILLYVALLE AVE LOS ANGELES CA 90032 | | |
| b Employer's FED ID number 95-4343492 | | a Employee's SSA number ▨▨▨▨ |
| 7 Social security tips | | 8 Allocated tips |
| 9 | | 10 Dependent care benefits |
| 11 Nonqualified plans | | 12a DD  5451.60 |
| 14 Other 354.90 CA SDI | | 12b |
| | | 12c |
| | | 12d |
| | | 13 Stat emp Ret. plan 3rd party sick pay |
| o/f Employee's name, address and ZIP code ▨▨▨▨▨▨▨ ▨▨▨▨▨▨▨ ARCADIA CA  ▨▨▨ | | |
| 15 State CA | Employers' state ID no. 223-9169 2 | 16 State wages, tips, etc. 35489.55 |
| 17 State income tax 1023.33 | | 18 Local wages, tips, etc. |
| 19 Local income tax | | 20 Locality name |
| CA State Filing Copy W-2 Wage and Tax 2014 Statement OMB No. 1545-0008 Copy 2 to be filed with employee's State income Tax Return | | |

201 →

(Figure 2B at right: identical W-2 labeled 220)

FIG. 2A        FIG. 2B

METHOD AND SYSTEM FOR IDENTIFYING AND ADDRESSING IMAGING ARTIFACTS TO ENABLE A SOFTWARE SYSTEM TO PROVIDE FINANCIAL SERVICES BASED ON AN IMAGE OF A FINANCIAL DOCUMENT

BACKGROUND

Optical character recognition ("OCR") is a computational technique for transforming images of text into text that can be recognized by a computing system. OCR engines/algorithms can be used to perform useful functions, such as enabling the electronic search of the content of an image of a document. OCR engines generally evaluate each portion of an image that could represent a letter, a number, or some other character. For example, an OCR engine may be set to evaluate each line, circle, dot or speck in an image to determine if these shapes represent letters, numbers or other characters. For example, an OCR engine may be set to evaluate each line to determine if the line is a number 1, a letter L, part of a number 7, part of a number 4, or the like. As another example, the OCR engine may be set to evaluate each dot or speck in an image to determine if the speck is a period, part of an ellipsis, or part of the lower case letter "i". Although these are simple examples of OCR engine functions, these examples illustrate that additional artifacts in an image can cause an OCR engine to operate significantly slower because the artifacts could be legitimate characters that should be converted to text by the OCR engine.

Artifacts in an image can make it difficult for an OCR engine to transform portions of an image into text. Artifacts in an image (e.g., visual artifacts) are generally unintended, undesired, and/or non-beneficial anomalies that are manifest in an image or in a representation of an image. Artifacts in an image, such as lines, dots, smears, and other image-related distortions can trigger analysis events within an OCR engine, and can cause the OCR engine to take orders of magnitude longer to process an image (as compared to the absence of the artifacts). What's more, artifacts in an image can cause the OCR engine to misinterpret or incorrectly translate portions of an image into text, in such a way that the resulting text fails to represent the text that is in the image. Incorrectly translating images into text can undermine the utility of an OCR engine and can reduce or destroy customer trust in software systems that employ OCR engines.

What is needed is a method and system for identifying and addressing imaging artifacts to enable a software system to provide financial services based on an image of a financial form, according to various embodiments.

SUMMARY

The Inventors have identified a unique issue for a service provider that provides electronic tax return preparation services. While enabling customers to use mobile devices (e.g., smart phones and tablets) to receive electronic tax return preparation services, some users have been capturing and submitting images of documents (e.g., tax forms) that have Moiré patterns (i.e., an image artifact). Moiré patterns in images of documents are undesirable because they extend processing time for optical character recognition engines and they potentially decrease the accuracy of optical character recognition engines. Interestingly, the Moiré patterns in images of documents frequently occur when users take digital images of cathode ray tube ("CRT") monitors. In other words, users are opening a financial document (e.g., a W-2) on a desktop computer that uses a CRT monitor, then the users are taking a picture of the document with a mobile device, in order to prepare their tax returns from their mobile devices. Embodiments of the present disclosure identify which document images include Moiré patterns or other image artifacts and then apply one or more filters to the document images that have been shown to be effective for reducing or removing Moiré patterns from document image data that represent the document images.

Disclosed herein are embodiments of systems and methods for identifying and addressing imaging artifacts to enable a software system to provide financial services based on an image of a financial form. The software system receives document image data, extracts image features from the document image data, and applies the image features to an analytics model to generate an image classification, according to one embodiment. The software system uses the image classification to determine whether the document image data contains one or more particular image artifacts (e.g., Moiré patterns), according to one embodiment. If the software system determines that it is likely that the document image data contains one or more particular image artifacts, then the software system applies a filter (e.g., a median filter) to the document image data to reduce and/or remove the one or more particular image artifacts, according to one embodiment. The software system provides the document image data to an optical character recognition engine to extract/identify the document content, according to one embodiment. The software system uses at least part of the document content as tax return preparation data to prepare and/or file one or more tax returns for the user, according to one embodiment. In alternative embodiments, the software system uses at least part of the document content to update, track, and/or maintain personal finances and/or business finances in a personal financial management system and/or a business financial management system.

These embodiments and additional embodiments are discussed in further detail below.

By identifying and addressing image artifacts in a document image, implementation of embodiments of the present disclosure allows for significant improvement to the fields of user experience, electronic tax return preparation, data analytics, data collection, and data processing, according to one embodiment. As one illustrative example, by identifying and addressing image artifacts in a document image, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. As a result, embodiments of the present disclosure allow for improved processor performance, more efficient use of memory access and data storage capabilities, reduced communication channel bandwidth utilization, and therefore faster communications connections.

In addition to improving overall computing performance, by identifying and addressing image artifacts in a document image, implementation of embodiments of the present disclosure represent a significant improvement to the field of automated user experiences and, in particular, efficient use of human and non-human resources. There is a long lasting need in the Internet-centric technology of electronic tax return preparation, enabling and facilitating the use of mobile devices to conveniently prepare tax returns. As one illustrative example, by enabling users to capture pictures of tax-related documents and by preparing a tax return based on document content from the captured pictures, a software system allows users to forego the tedious process of manually entering information from documents into a computing system. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIGS. 2A and 2B are diagrams of examples of document images that are with and without a particular image artifact, in accordance with one embodiment.

Figure 1:
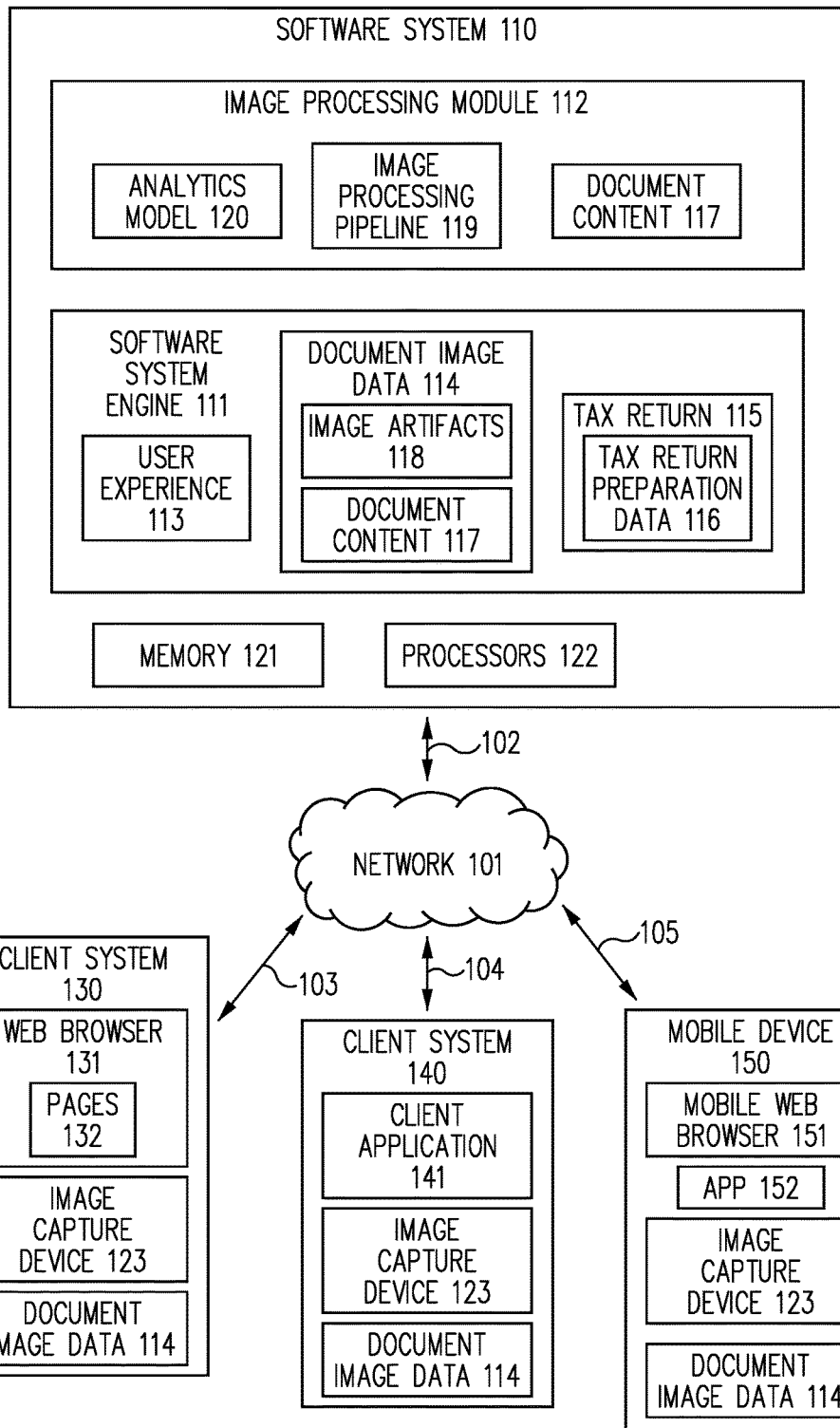
FIG. 1 is a block diagram of an example architecture for identifying and addressing imaging artifacts in document images, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM and the PROCESS AND HARDWARE ARCHITECTURE sections herein describe systems and processes suitable for identifying and addressing imaging artifacts to enable a software system to provide financial services based on an image of a financial form, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators;

images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

Process and Hardware Architecture

The Inventors have identified a unique issue for a service provider that provides electronic tax return preparation services. While enabling customers to use mobile devices (e.g., smart phones and tablets) to receive electronic tax return preparation services, some users have been capturing and submitting images of documents (e.g., tax forms) that have Moiré patterns (i.e., an image artifact). Moiré patterns in images of documents are undesirable because they extend processing time for optical character recognition engines and they potentially decrease the accuracy of optical character recognition engines. Interestingly, the Moiré patterns in images of documents frequently occur when users take digital images of cathode ray tube ("CRT") monitors. In other words, users are opening a document, such as a W-2, on a desktop computer that uses a CRT monitor, then the users are taking a picture of the document with a mobile device to prepare a tax return from the mobile device using the picture of the document that is captured from a CRT monitor. Embodiments of the present disclosure identify which document images include Moiré patterns or other image artifacts and then apply one or more filters to the document images that have been shown to be effective for reducing or removing Moiré patterns from document image data that represents the document images.

Disclosed herein are embodiments of systems and methods for identifying and addressing imaging artifacts to enable a software system to provide financial services based on an image of a financial form. The software system receives document image data, extracts image features from the document image data, and applies the image features to an analytics model to generate an image classification, according to one embodiment. The software system uses the image classification to determine whether the document image data contains one or more particular image artifacts (e.g., Moiré patterns), according to one embodiment. If the software system determines that it is likely that the document image data contains one or more particular image artifacts, then the software system applies a filter (e.g., a median filter) to the document image data to reduce and/or remove the one or more particular image artifacts, according to one embodiment. The software system provides the document image data to an optical character recognition engine to extract/identify the document content, according to one embodiment. The software system uses at least part of the document content as tax return preparation data to prepare and/or file one or more tax returns for the user, according to one embodiment. In alternative embodiments, the software system uses at least part of the document content to update, track, and/or maintain personal finances and/or business finances in a personal financial management system and/or a business financial management system.

FIG. 1 illustrates an example of a production environment 100 that is configured to identify and address imaging artifacts to enable a software system to provide financial services based on an image of a financial form, according to one embodiment. Some images of financial forms include image artifacts that interfere with optical character recognition ("OCR") engines/algorithms. The software system of the production environment 100 is configured to receive an image of a financial form, detect the presence of image artifacts, such as the Moiré effect, apply filters that reduce or remove the image artifacts from the image, identify the content of the financial form, and provide one or more financial services based on the content of the financial form, according to one embodiment. In one embodiment, the one or more financial services includes preparing and/or filing a tax return for the user. The production environment 100 includes a software system 110, a client system 130, a client system 140, a mobile device 150, and network 101, according to one embodiment. The software system 110 communicates with the client system 130, the client system 140, and the mobile device 150 through one or more communications channels 102, 103, 104, and 105, through the network 101, according to one embodiment.

The software system 110 represents one or more computing systems such as, but not limited to, a server, a computing cabinet, and/or distribution center that is configured to receive, execute, and host one or more applications for access by one or more users, e.g., clients of the service provider, according to one embodiment. The software system 110 represents a traditional data center computing environment, a virtual asset computing environment (e.g., a cloud computing environment), or a hybrid between a traditional data center computing environment and a virtual asset computing environment, to host one or more software systems, according to one embodiment. The software system 110 can include, but is not limited to tax return preparation system, another financial management system, and an application that supports the tax return preparation system and/or the other financial management system, according to one embodiment.

The software system 110 includes a number of functional components and/or features for identifying and addressing imaging artifacts to enable the software system 110 to provide financial services based on an image of a financial form or other document, according to one embodiment. The software system 110 includes a software system engine 111 and an image processing module 112 for identifying and addressing imaging artifacts in financial forms or other documents, and for providing financial services based on an image of the financial forms or other documents, according to one embodiment.

The software system 110 uses the software system engine 111 communicate information between the software system 110 and users of the software system 110, according to one embodiment. The software system 110 also uses the software system engine 111 to provide one or more financial services, e.g., prepare/file a tax return, based on images of documents received from users (e.g., the client system 130, the client system 140, the mobile device 150, etc.). The software system engine 111 provides the user experience 113 to receive document image data 114 from users, according to one embodiment. The software system engine 111 uses the user experience 113 to provide information to the user regarding the user's tax return 115 and/or tax return preparation data 116 that is associated with the tax return 115, according to one embodiment.

The user experience 113 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the information from users, according to one embodiment.

The software system engine 111 receives the document image data 114 from a user of the software system, according to one embodiment. The document image data 114 represents a document image, according to one embodiment. The document image is an image of a financial form or other document that includes document content 117, according to one embodiment. The document image data 114 is acquired by user using one or more image capture devices, such as an image sensor on a smart phone, cell phone, tablet, digital camera, laptop, and the like, according to one embodiment. In one embodiment, the document image data 114 represents one or more of a document image of a financial document such as a W-2, a form 1040, a form 1099, a schedule A, a schedule B, a schedule C, a schedule D, a schedule E, a schedule F, a schedule G, a schedule J, schedule K, schedule SE, a form 1106, a form 1310, a form 2106, a form 2120, a form 2210, a form 2439, a document that includes information about charitable contributions, a document that includes property tax information, a document that includes information about other expenses, deductions, and/or income, a receipt, a work order, and any other tax-related or business-related document, according to one embodiment.

The document content 117 represents one or more user characteristics for users of the software system 110, according to one embodiment. The document content 117 includes information from one or more previous years' tax return data for a particular user, according to one embodiment. The document content 117 is stored in a data store, a database, and/or a data structure in the software system 110, according to one embodiment. The document content 117 also includes, but is not limited to, a payroll information, state agency records, federal agency records, military records, public records, private company records, and the like, according to one embodiment. Additional examples of the document content 117 includes, but is not limited to, a user's name, a Social Security number, a government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The document image data can include one or more image artifacts 118, which can interfere with efficient or correct interpretation of the document content 117 by an OCR engine or other image processor, according to one embodiment. The image artifacts 118 can include Moiré effects or other artifacts, which may be manifest in a rendering of a document image as lines, patterns, docs, specs, zigzags, circles, dark spots, and/or other unintended, undesired, and/or non-beneficial anomalies that are manifest in an image or in a representation of an image, according to one embodiment. When a person takes a picture of an image that is displayed by a cathode ray tube ("CRT") monitor (e.g., a computer monitor or television), the rendering of the image, e.g., the document image data 114, will frequently manifest one or more Moiré effects and/or other artifacts. During tax season, some users will capture images of financial documents using an image sensor from a smart phone or other mobile device. Interestingly, rather than using their desktop computer (inclusive of a CRT monitor) to prepare their tax returns, a number of users will capture an image of a financial document with a smart phone or other mobile device by taking a picture of the financial document as the financial document is displayed on the CRT monitor. Because users want to use their mobile devices to prepare their tax returns, some users prefer to take a picture of a financial document that the user has opened or downloaded with their desktop computer and continue preparing their tax return with their mobile device with the image of the financial document that was captured from the security monitor. In one study, the Inventors of the present disclosure identified that 5-10% of tax return filers who used TurboTax in 2015 attempted to prepare a tax return with a mobile device and with an image of a financial document that was displayed on a CRT monitor and that was captured with a mobile device (e.g., a smart phone).

Because images of documents displayed on a CRT monitor that are captured with a digital camera and/or image sensor manifest image artifacts 118 such as the Moiré effect, removing and/or reducing image artifacts from document image data 114 can provide strategic advantages for the service provider that provides financial services such as electronic tax return preparation services. By removing and/or reducing the image artifacts 118 from the document image data 114, the software system 110 enables users to receive financial services (e.g., have their tax returns electronically prepared) in a manner that is convenient to the users, according to one embodiment. By removing and/or reducing the image artifacts from the document image data 114, the software system 110 improves the brand recognition of the service provider of the software system 110 by increasing and/or maintaining the confidence of the users in the ability of the software system 110 to provide the financial services in a way that supports the manner that users choose to provide their document content 117 (e.g., through a digital image of a financial document that is displayed on a CRT monitor), according to one embodiment.

The software system engine 111 uses the document content 117 to prepare and/or file a tax return 115, according to one embodiment. Preparing and/or filing a tax return 115 includes applying various tax return preparation data 116 to one or more rules, regulations, and/or equations to prepare the tax return 115, according to one embodiment. The software system engine 111 and/or another feature/component of the software system 110 obtains the tax return preparation data 116 from the document content 117, according to one embodiment. In one embodiment, the document content 117 includes more information than the tax return preparation data 116, so that the tax return preparation data 116 is a subset of the document content 117.

The software system 110 uses the image processing module 112 to remove and/or reduce the image artifacts 118 from the document image data 114 to support providing one or more financial services by the software system 110, according to one embodiment. The software system 110 uses the image processing module 112 to remove and/or reduce the image artifacts 118 from the document image data 114 in order to extract the document content 117 from the document image data 114, to provide the document content 117 to the software system engine 111, and to facilitate the preparation and/or filing of the tax return 115 (and/or to support providing one or more other financial services), according to one embodiment.

The image processing module 112 uses an image processing pipeline 119 and an analytics model 120 to extract and/or identify the document content 117, according to one embodiment. The image processing pipeline 119 receives the document image data 114, applies the document image data 114 to a feature extractor to identify image feature data that represents image features associated with the document image data 114, according to one embodiment. In one embodiment, the image processing pipeline 119 uses an ORB algorithm as a feature extractor to generate/identify image features from the document image data 114. The image processing module 112 applies the image features to the analytics model 120, which has been trained to detect image artifacts 118 (such as the Moiré effect), according to one embodiment. In one embodiment, the image processing module 112 uses gradient boosted decision trees to define the analytics model 120. The analytics model 120 generates model results that include an image classification of the document image data 114, according to one embodiment. The image classification represents the likelihood that the document image data 114 includes the image artifacts 118, according to one embodiment. The image processing pipeline 119 determines whether the document image data 114 includes the image artifacts 118 at least partially based on the image classification, according to one embodiment. If the image processing pipeline 119 determines that the document image data 114 includes the image artifacts 118, then the image processing pipeline 119 applies an image artifacts filter to remove and/or reduce the image artifacts 118, according to one embodiment. In one embodiment, the image artifacts filter is a median filter that assigns a center pixel with a median value of a predetermined number of surrounding pixels (e.g., in an octagon, circle, square, or other shape around the central pixel). In one embodiment, the image artifacts filter reduces the prevalence of the Moiré effect in the document image data 114, to enable an OCR engine to more quickly and more accurately extract the document content 117 from the document image data 114, according to one embodiment. The image processing pipeline 119 then applies the document image data 114 to an OCR engine to extract the document content 117 from the document image data 114, according to one embodiment. Once the document content 117 has been extracted from the document image data 114, the image processing module 112 provides the document content 117 to the software system engine 111 and/or to the software system 110 for use by the software system 110 in providing one or more financial services to users, according to one embodiment. In one embodiment, the image processing module 112 provides the document content 117 to the software system engine 111 and/or to the software system 110 by storing the document content 117 in one or more sections of memory allocated for storage of the document content 117.

The client system 130 includes a web browser 131 used to access one or more pages 132 to enable one or more users to interact with the software system 110, according to one embodiment.

The client system 140 includes a client application 141 installed on the client system 140, to enable a user to interact with the software system 110, according to one embodiment. In one embodiment, the client system 140 is a desktop computing system, according to one embodiment.

The mobile device 150 includes a mobile web browser 151 and/or an application ("app") 152 for remotely accessing and interacting with the software system 110, according to one embodiment. In one embodiment, the mobile device 150 is a tablet, a smart phone, a laptop, a personal digital assistant, and the like, according to various embodiments.

The client system 130, the client system 140, and the mobile device 150 are representative of one or more of a plurality of systems/devices which users of the software system 110 can use to access, interact with, and receive services from the software system 110, according to one embodiment. In one embodiment, one or more of the client system 130, the client system 140, and the mobile device 150 include an image capture device 123 that is used for acquiring and/or generating the document image data 114 by capturing a digital image of a financial document.

The software system 110 is stored in and utilizes memory 121 for identifying and addressing imaging artifacts, according to one embodiment. The software system 110 uses one or more processors 122 to execute instructions stored in the memory 121 to perform identifying and addressing imaging artifacts, to enable the software system 110 to provide financial services based on an image of a financial form, according to one embodiment.

FIGS. 2A and 2B illustrate examples of document images and illustrate examples of image artifacts such as the Moiré effect. FIG. 2A is an image of a financial document 200, according to one embodiment. The image of a financial document 200 includes various document content such as wages, federal income tax withheld, Social Security tax withheld, Medicare tax withheld, an employer name, an employee identification, and the like. The image of a financial document 200 also includes image artifacts 201 that occupy much of the white space between the text of the image of a financial document 200. The image artifacts 201 are representative of a Moiré effect/Moiré patterns that can be caused by taking a digital image of a CRT monitor. FIG. 2B is an image of a financial document 220 that illustrates an example of the reduction and/or removal of one or more image artifacts from a document image, using the software system 110 (shown in FIG. 1) and/or method/process 300, 400, and/or 500 (shown in FIGS. 3, 4, and/or 5 respectively) disclosed herein, according to one embodiment. In particular, the image artifacts 201 that are an expression of a Moiré effect/Moiré patterns have been substantially removed from the document image by identifying that the financial document 200 includes the image artifacts 201 and then by applying a filter (e.g., a median filter) to the pixels and/or data that represents the document image, according to one embodiment. Although some of the sharpness around some of the text/characters may be sacrificed, the improvement in image contrast and/or the reduction/removal of the dark patterns improve the speed and accuracy of optical character recognition of the document content of the financial document 220, according to one embodiment.

Figure 3:
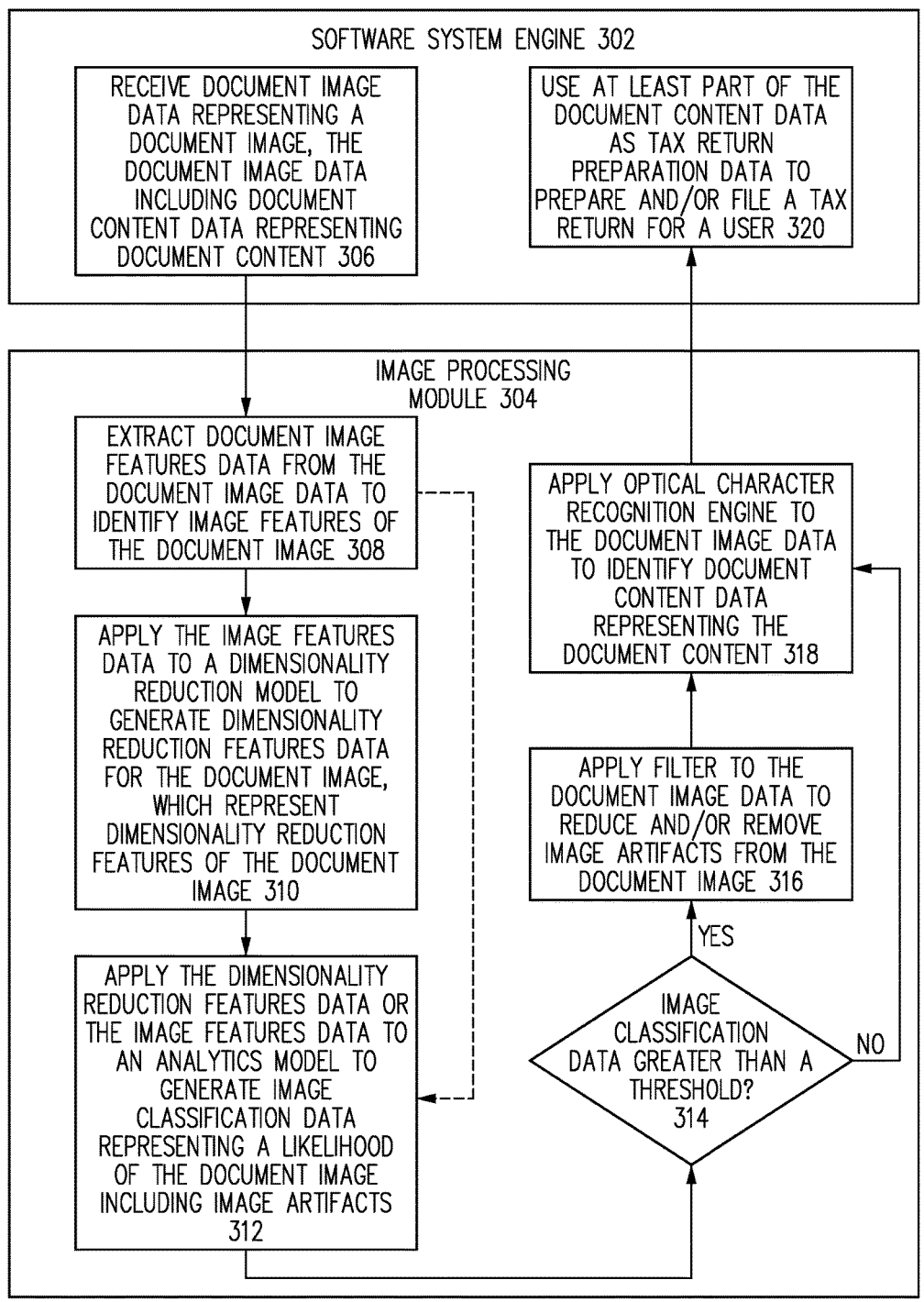
FIG. 3 is a flow diagram of an example of a process for identifying and addressing imaging artifacts to enable a software system to provide financial services based on an image of a document, in accordance with one embodiment.

FIG. 3 illustrates a process 300 for identifying and addressing imaging artifacts to enable a software system to provide financial services based on an image of a document, such as a financial form, according to one embodiment. In one embodiment, addressing imaging artifacts includes applying one or more filters to reduce the magnitude of the image artifacts. The process 300 uses a software system engine 302 and an image processing module 304 for identifying and addressing imaging artifacts to enable the software system to provide financial services based on an image of a document, according to one embodiment. The software system engine 302 is the software system engine 111 that is shown in FIG. 1, and the image processing module 304 is the image processing module 112 that is shown in FIG. 1, according to one embodiment. In one embodiment, one or more of the operations of the process 300 are interchangeable between the software system engine 302 and the image processing module 304.

At operation 306, the software system engine 302 receives document image data representing a document image, the document image data including document content data representing document content, according to one embodiment. In one embodiment, the document image data is the document image data 114 that is shown in FIG. 1. Operation 306 proceeds to operation 308, according to one embodiment.

At operation 308, the image processing module 304 extracts document image features data from the document image data to identify image features of the document image, according to one embodiment. The image processing module 304 uses a feature extraction and/or feature detection algorithm, such as ORB ("Oriented FAST and Rotated BRIEF") to detect image features data in the document image data, according to one embodiment. The image features data in the document image data represent image features of a document image, according to one embodiment. In one embodiment, the image features include edges, corners/interest points, blobs/regions of interest, ridges, and the like, according to one embodiment. Edges include boundaries between at least two image regions, according to one embodiment. Corners/interest points include rapid changes in direction for edges and include point-like features in an image, according to one embodiment. Blobs/regions of interest in an image are generally smoother than a corner and which might be skipped or overlooked by corner detection algorithms, according to one embodiment. Ridges include curves in an image, according to one embodiment. Operation 308 proceeds to operation 310, according to one embodiment. In one embodiment, operation 308 proceeds to operation 312, by skipping operation 310, according to one embodiment.

At operation 310, the image processing module 304 applies the image features data to a dimensionality reduction model to generate dimensionality reduction features data for the document image, which represent dimensionality reduction features of the document image, according to one embodiment. Dimensionality reduction is the general process of reducing extracted image features into a subset of features or attributes. Dimensionality reduction can decrease the amount of time used to analyze image features data. Operation 310 proceeds to operation 312, according to one embodiment.

At operation 312, the image processing module 304 applies the dimensionality reduction features data or the image features data to an analytics model to generate image classification data representing a likelihood of the document image including image artifacts, according to one embodiment. In one embodiment, the image classification data is a number between 0 and 1 that represents a likelihood that a document image includes a particular image artifact, such as Moiré patterns or a Moiré effect. Operation 312 proceeds to operation 314, according to one embodiment.

At operation 314, the image processing module 304 determines if the image classification data is greater than a threshold, according to one embodiment. Examples of thresholds include 0.6, 0.7, 0.8, 0.9, etc. In one embodiment, the thresholds represent a percentage of likelihood (e.g., 60%, 70%, 80%, 90%, etc.) that the image classification data indicates the presence of one or more image artifacts or one or more particular image artifacts (e.g., Moiré patterns or Moiré effect) in the document image. If the image classification data is less than or equal to the threshold, operation 314 proceeds to operation 318, according to one embodiment. If the image classification data is greater than the threshold, operation 314 proceeds to operation 316, according to one embodiment. In other words, the image processing module 304 applies a filter (e.g., a median filter) to the document image data to remove/reduce image artifacts only if the image processing module 304 determines that image artifacts are likely to be present in the document image data, according to one embodiment.

At operation 316, the image processing module 304 applies a filter to the document image data to reduce and/or remove image artifacts from the document image, according to one embodiment. In one embodiment, the filter is a median filter having a window, a window shape, and a number of entries (e.g., pixels). The median filter can have a window shape that is rectangular, octagonal, square, circular, an oval, triangular, or otherwise polygonal, according to one embodiment. The window includes 10, 12, 14, 20, 25, or some other predetermined number of entries (e.g., pixels), according to one embodiment. The median filter changes the value of a first entry or pixel to equal of the average of the values of all of the other entries or pixels within a window, according to one embodiment. In one embodiment, the first entry or pixel is in the center of the window. Operation 316 proceeds to operation 318, according to one embodiment.

At operation 318, the image processing module 304 applies optical character recognition engine to the document image data to identify document content data representing the document content, according to one embodiment. Operation 318 proceeds to operation 320, according to one embodiment.

At operation 320, the software system engine 302 uses at least part of the document content data as tax return preparation data to prepare and/or file a tax return for a user, according to one embodiment. The software system engine 302 uses at least part of the document content data to update, track, and/or otherwise maintain personal finance records of a personal finance management system and/or business records of a business finance management system, according to one embodiment.

The process 300 employs a feedback loop to increase the likelihood of efficiently and correctly identifying the document content from document image data, according to one embodiment. The process 300 analyzes the quality of an image and request that a user provide new document image data if the quality of an image is below a threshold, according to one embodiment. If for example, a user captures an image of a financial document in low light conditions, while shaking the camera, while using a flash with the camera, the image processing module may be unable to conclusively determine whether or not a particular image artifact is present in the document image. If the image processing module is unable to determine whether or not a particular image artifact is present in the document image, the software system requests that the user recapture the image and/or resends the image to the software system, according to one embodiment. In one embodiment, if the image classification data is between two thresholds, the image processing module 304 is configured to determine the accurate detection of the presence of Moiré patterns or the Moiré effect is unlikely. For example, if the image classification data is greater than 0.4 and less than 0.6, then the image processing module 304 is configured to determine that the accurate detection of the presence of Moiré patterns is unlikely, and the software system requests a new document image from the user, according to one embodiment.

Figure 4:
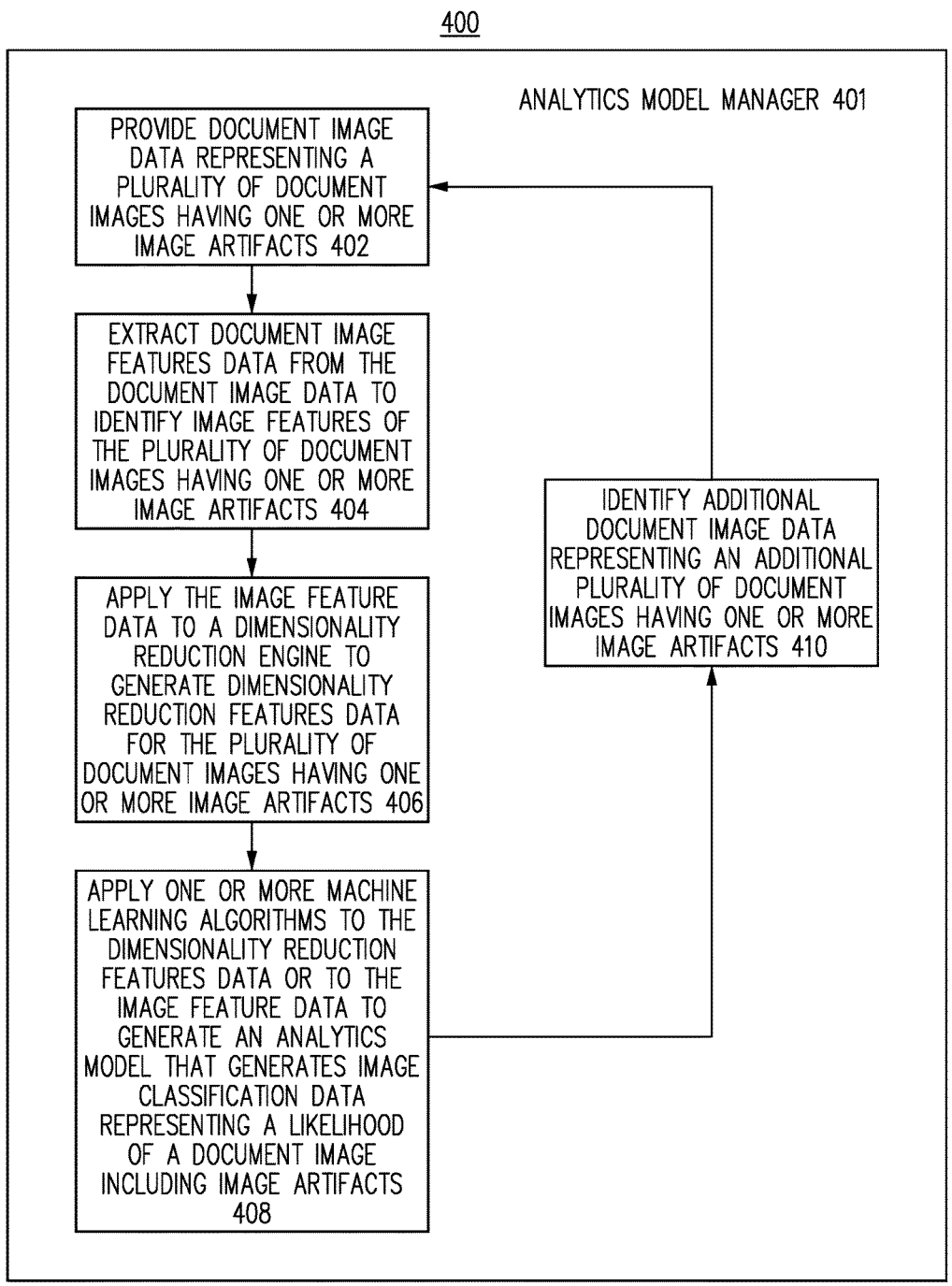
FIG. 4 is a flow diagram of an example of a process for training an analytics model that can be used to identify one or more image artifacts in document images, according to one embodiment.

FIG. 4 illustrates a process 400 for training an analytics model that can be used by an image processor and/or an image processing pipeline to identify whether or not document image data includes one or more image artifacts, according to one embodiment. The process 400 uses an analytics model manager 401, an image processor, an image processing pipeline, and/or another feature, module, ancestral component of a software system (e.g., the software system 110 shown in FIG. 1) to train the analytics model, according to one embodiment.

At operation 402, the process provides document image data representing a plurality of document images having one or more image artifacts, according to one embodiment. Operation 402 proceeds to operation 404, according to one embodiment.

At operation 404, the process extracts document image features data from the document image data to identify image features of the plurality of document images having one or more image artifacts, according to one embodiment. Operation 404 proceeds to operation 406, according to one embodiment.

At operation 406, the process applies the image feature data to a dimensionality reduction engine to generate dimensionality reduction features data for the plurality of document images having one or more image artifacts, according to one embodiment. The dimensionality reduction features data represents a plurality of dimensionality reduction features for the plurality of document images having one or more image artifacts, according to one embodiment. Operation 406 proceeds to operation 408, according to one embodiment.

At operation 408, the process applies one or more machine learning algorithms to the dimensionality reduction features data or to the image feature data to generate an analytics model that generates image classification data representing a likelihood of a document image including image artifacts, according to one embodiment.

The process 400 defines, trains and/or updates the analytics model using techniques and/or machine learning algorithms that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. In one embodiment, the process uses gradient boosted decision trees to train the analytics model to detect Moiré effects or patterns in document images. In one embodiment, the analytics model that is defined by applying the gradient boosted decision trees to the image feature data advantageously produces image classification data in less than a second. Providing sub-second image classification enables/supports real-time image processing and/or artifact detection, while concurrently improving the capability of OCR engines to detect and/or identify document content, according to one embodiment.

Operation 408 proceeds to operation 410, according to one embodiment.

At operation 410, the process identifies additional document image data representing an additional plurality of document images having one or more image artifacts, according to one embodiment. The additional document image data are used to further refine, evolve, and/or improve the image artifacts detection capability of the analytics model, according to one embodiment. The additional document image data represent additional document images and can be identified based on feedback (e.g., complaints) from users of the software system (e.g., the software system 110 shown in FIG. 1), according to one embodiment. Operation 410 proceeds to operation 402, to continue the process of training the analytics model, according to one embodiment.

Figure 5A:
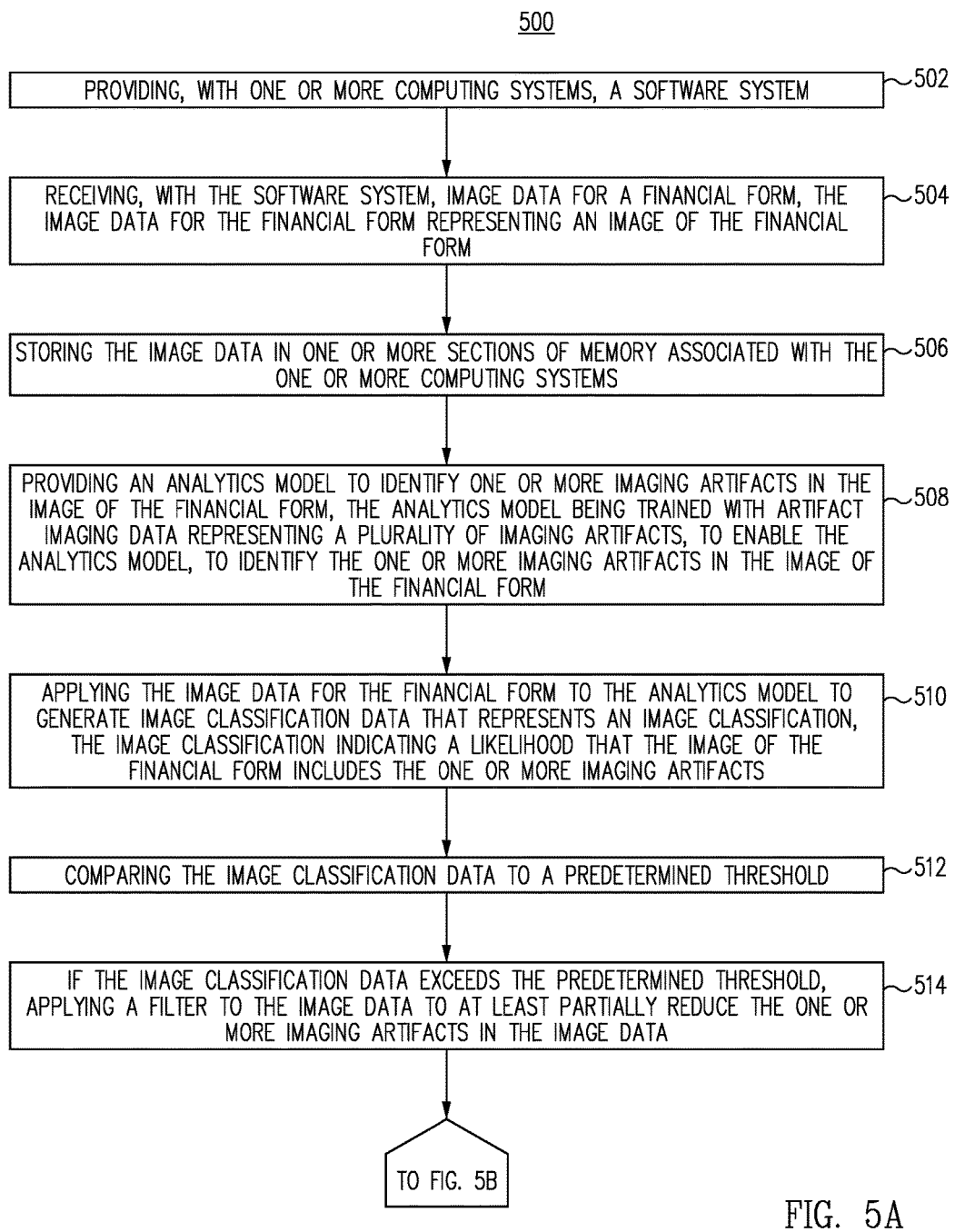
FIGS. 5A and 5B are a flow diagram of an example of a process for identifying and addressing imaging artifacts to enable a software system to provide financial services based on an image of a document, according to one embodiment.
Figure 5B:
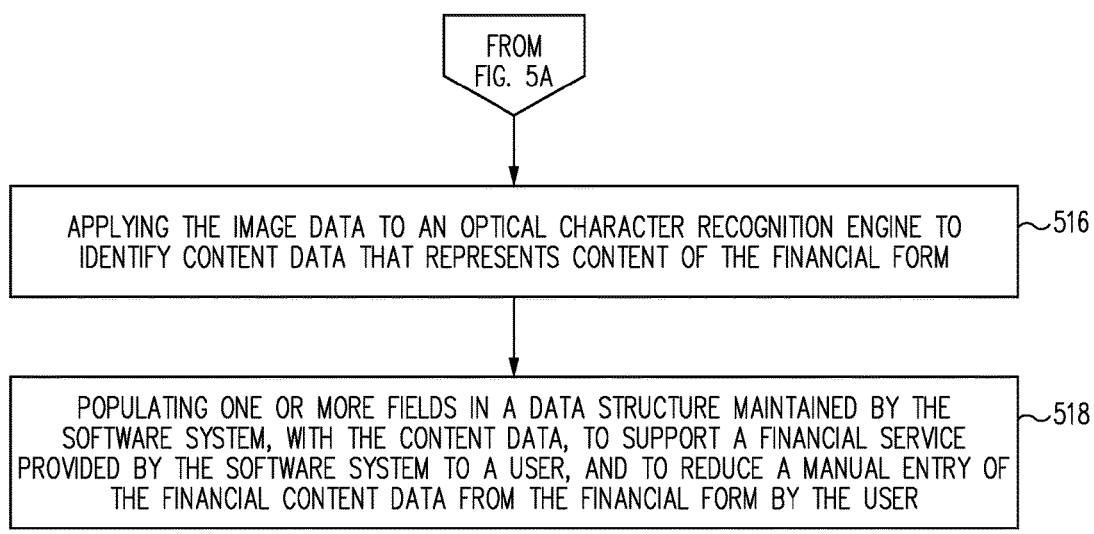

FIGS. 5A and 5B illustrate an example flow diagram of a process 500 for identifying and addressing imaging artifacts to enable a software system to provide financial services based on an image of a document, such as a financial form, according to one embodiment.

At operation 502, the process includes providing, with one or more computing systems, a software system, according to one embodiment.

At operation 504, the process includes receiving, with the software system, image data for a financial form, the image data for the financial form representing an image of the financial form, according to one embodiment.

At operation 506, the process includes storing the image data in one or more sections of memory associated with the one or more computing systems, according to one embodiment.

At operation 508, the process includes providing an analytics model to identify one or more imaging artifacts in the image of the financial form, the analytics model being trained with artifact imaging data representing a plurality of imaging artifacts, to enable the analytics model to identify the one or more imaging artifacts in the image of the financial form, according to one embodiment.

At operation 510, the process includes applying the image data for the financial form to the analytics model to generate image classification data that represents an image classification, the image classification indicating a likelihood that the image of the financial form includes the one or more imaging artifacts, according to one embodiment.

At operation 512, the process includes comparing the image classification data to a predetermined threshold, according to one embodiment.

At operation 514, if the image classification data exceeds the predetermined threshold, the process includes applying a filter to the image data to at least partially reduce the one or more imaging artifacts in the image data, according to one embodiment.

At operation 516, the process includes applying the image data to an optical character recognition engine to identify content data that represents content of the financial form, according to one embodiment.

At operation 518, the process includes populating one or more fields in a data structure maintained by the software system, with the content data, to support a financial service provided by the software system to a user, and to reduce a manual entry of the financial content data from the financial form by the user, according to one embodiment.

By identifying and addressing image artifacts in a document image, implementation of embodiments of the present disclosure allows for significant improvement to the fields of user experience, electronic tax return preparation, data analytics, data collection, and data processing, according to one embodiment. As one illustrative example, by identifying and addressing image artifacts in a document image, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. As a result, embodiments of the present disclosure allow for improved processor performance, more efficient use of memory access and data storage capabilities, reduced communication channel bandwidth utilization, and therefore faster communications connections.

In addition to improving overall computing performance, by identifying and addressing image artifacts in a document image, implementation of embodiments of the present disclosure represent a significant improvement to the field of automated user experiences and, in particular, efficient use of human and non-human resources. There is a long lasting need in the Internet-centric technology of electronic tax return preparation, enabling and facilitating the use of mobile devices to conveniently prepare tax returns. As one illustrative example, by enabling users to capture pictures of tax-related documents and by preparing a tax return based on document content from the captured pictures, a software system allows users to forego the tedious process of manually entering information from documents into a computing system. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method identifies and addresses imaging artifacts to enable a software system to provide financial services that are at least partially based on an image of a financial document. The method includes providing, with one or more computing systems, a software system, according to one embodiment. The method includes receiving, with the software system, image data for a financial document, the image data for the financial document representing an image of the financial document, according to one embodiment. The method includes storing the image data in one or more sections of memory associated with the one or more computing systems, according to one embodiment. The method includes providing an analytics model to identify one or more imaging artifacts in the image of the financial document, the analytics model being trained with artifact imaging data representing a plurality of imaging artifacts, to enable the analytics model to identify the one or more imaging artifacts in the image of the financial document, according to one embodiment. The method includes applying the image data for the financial document to the analytics model to generate image classification data that represents an image classification, the image classification indicating a likelihood that the image of the financial document includes the one or more imaging artifacts, according to one embodiment. The method includes comparing the image classification data to a predetermined threshold, according to one embodiment. The method includes if the image classification data exceeds the predetermined threshold, applying a filter to the image data to at least partially reduce the one or more imaging artifacts in the image data, according to one embodiment. The method includes applying the image data to an optical character recognition engine to identify content data that represents content of the financial document, according to one embodiment. The method includes populating one or more fields in a data structure maintained by the software system, with the content data, to support a financial service provided by the software system to a user, and to reduce a manual entry of the content data from the financial document and into the software system by the user.

In accordance with an embodiment, a system identifies addresses imaging artifacts to enable a software system to provide financial services that are at least partially based on an image of a financial document. The system includes a system engine that receives image data for a financial document, the image data for the financial document representing an image of the financial document, the image data for the financial document including content data for the financial document representing content of the financial document, according to one embodiment. The system engine prepares a tax return for a user at least partially based on the content of the financial document, according to one embodiment. The system includes an image processing module communicatively coupled to the system engine to receive the image data for the financial document from the system engine and to provide the content data, according to one embodiment. The image processing module generates image classification data by application of an analytics model to image features data that are extracted from the image data for the financial document, according to one embodiment. The image processing module applies a filter to the image data for the financial document to reduce image artifact data in the image data for the financial document, if the image classification data exceeds a predetermined threshold, according to one embodiment. The image processing module identifies the content data from the image data for the financial document, according to one embodiment.

In accordance with an embodiment, a system identifies and addresses imaging artifacts to enable a software system to provide financial services that are at least partially based on an image of a financial document. The system includes one or more processors and a memory communicatively coupled to the one or more processors, according to one embodiment. The memory stores instructions that, when executed by the one or more processors, performs a process of identifying and addressing imaging artifacts to enable a software system to provide financial services that are at least partially based on an image of a financial document, according to one embodiment. The process includes providing the software system, according to one embodiment. The process includes receiving, with the software system, image data for a financial document, the image data for the financial document representing an image of the financial document, according to one embodiment. The process includes storing the image data in one or more sections of the memory, according to one embodiment. The process includes providing an analytics model to identify one or more imaging artifacts in the image of the financial document, the analytics model being trained with artifact imaging data representing a plurality of imaging artifacts, to enable the analytics model to identify the one or more imaging artifacts in the image of the financial document, according to one embodiment. The process includes applying the image data for the financial document to the analytics model to generate image classification data that represents an image classification, the image classification indicating a likelihood that the image of the financial document includes the one or more imaging artifacts, according to one embodiment. The process includes comparing the image classification data to a predetermined threshold, according to one embodiment. The process includes if the image classification data exceeds the predetermined threshold, applying a filter to the image data to at least partially reduce the one or more imaging artifacts in the image data, according to one embodiment. The process includes applying the image data to an optical character recognition engine to identify content data that represents content of the financial document, according to one embodiment. The process includes populating one or more fields in a data structure maintained by the software system, with the content data, to support a financial service provided by the software system to a user, and to reduce a manual entry of the content data from the financial document by the user.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer system implemented method for identifying and addressing imaging artifacts to enable a software system to provide financial services that are at least partially based on an image of a financial document, comprising:
   providing, with one or more computing systems, a software system;
   receiving, with the software system, image data for a financial document, the image data for the financial document representing an image of the financial document;
   storing the image data in one or more sections of memory associated with the one or more computing systems;
   providing an analytics model to identify one or more imaging artifacts in the image of the financial document, the analytics model being trained with artifact imaging data representing a plurality of imaging artifacts, to enable the analytics model to identify the one or more imaging artifacts in the image of the financial document;
   applying the image data for the financial document to the analytics model to generate image classification data that represents an image classification, the image classification indicating a likelihood that the image of the financial document includes the one or more imaging artifacts;
   comparing the image classification data to a predetermined threshold;
   if the image classification data exceeds the predetermined threshold, applying a filter to the image data to at least partially reduce the one or more imaging artifacts in the image data;
   applying the image data to an optical character recognition engine to identify content data that represents content of the financial document; and
   populating one or more fields in a data structure maintained by the software system, with the content data, to support a financial service provided by the software system to a user, and to reduce a manual entry of the content data from the financial document and into the software system by the user.

2. The computer system implemented method of claim 1, wherein the software system is selected from a group of software systems consisting of: a tax return preparation system; a personal finances management system; and a business finances management system.

3. The computer system implemented method of claim 1, wherein the one or more computer systems are selected from a group of computing systems consisting of: a mobile computing system, a cloud computing environment, and a server computing system.

4. The computer system implemented method of claim 1, wherein the one or more imaging artifacts are one or more patterns from Moiré effect.

5. The computer system implemented method of claim 1, wherein the one or more imaging artifacts result from capturing an image of a computer monitor with an image sensor.

6. The computer system implemented method of claim 5, wherein the computer monitor is a cathode ray tube ("CRT") computer monitor.

7. The computer system implemented method of claim 5, wherein the image sensor is part of a camera of a mobile device or a digital camera.

8. The computer system implemented method of claim 1, further comprising:
   using at least some of the content data to electronically prepare a tax return for the user.

9. The computer system implemented method of claim 1, further comprising:
   training the analytics model by applying one or more machine learning algorithms to existing image data for plurality of documents that include the one or more imaging artifacts.

10. The computer system implemented method of claim 9, wherein the one or more machine learning algorithms include gradient boosted decision trees.

11. The computer system implemented method of claim 1, wherein applying the image data for the financial document to the analytics model includes:
   extracting image features data from the image data for the financial document, the image features data representing one or more image features for the financial document; and
   applying the image features data to the analytics model.

12. The computer system implemented method of claim 11, wherein the one or more image features for the financial document include one or more of edges, corners, blobs, and ridges.

13. The computer system implemented method of claim 1, wherein the filter is a median filter having a window that includes a window shape and a quantity of window elements.

14. The computer system implemented method of claim 13, wherein applying the filter to the image data includes applying the median filter to the image data, wherein applying the median filter to the image data includes assigning a value to a central one of the quantity of window elements at least partially based on an average of values of those of the quantity of window elements that surround the central one of the quantity of window elements in the window.

15. The computer system implemented method of claim 13, wherein the quantity of window elements are a quantity of pixels.

16. The computer system implemented method of claim 1, wherein reducing the one or more imaging artifacts in the image data includes removing the one or more imaging artifacts from the image data.

17. The computer system implemented method of claim 1, wherein the content data is selected from a group of user characteristics data consisting of:
   data indicating a name of the user;
   data indicating an age of the user;
   data indicating an age of a spouse of the user;
   data indicating a zip code;
   data indicating a tax return filing status;
   data indicating state income;
   data indicating a home ownership status;
   data indicating a home rental status;
   data indicating a retirement status;
   data indicating a student status;
   data indicating an occupation of the user;
   data indicating an occupation of a spouse of the user;
   data indicating whether the user is claimed as a dependent;
   data indicating whether a spouse of the user is claimed as a dependent;
   data indicating whether another taxpayer is capable of claiming the user as a dependent;
   data indicating whether a spouse of the user is capable of being claimed as a dependent;
   data indicating salary and wages;
   data indicating taxable interest income;
   data indicating ordinary dividend income;
   data indicating qualified dividend income;
   data indicating business income;
   data indicating farm income;
   data indicating capital gains income;
   data indicating taxable pension income;
   data indicating pension income amount;
   data indicating IRA distributions;
   data indicating unemployment compensation;
   data indicating taxable IRA;
   data indicating taxable Social Security income;
   data indicating an amount of Social Security income;
   data indicating an amount of local state taxes paid;
   data indicating whether the user filed a previous years' federal itemized deduction;
   data indicating whether the user filed a previous years' state itemized deduction;
   data indicating an annual income;
   data indicating an employer's address;
   data indicating contractor income;
   data indicating a marital status;
   data indicating a medical history;
   data indicating dependents;
   data indicating assets;
   data indicating spousal information;
   data indicating children's information;
   data indicating an address;
   data indicating a Social Security Number;
   data indicating a government identification;
   data indicating a date of birth;
   data indicating educator expenses;
   data indicating health savings account deductions;
   data indicating moving expenses;
   data indicating IRA deductions;
   data indicating student loan interest deductions;
   data indicating tuition and fees;
   data indicating medical and dental expenses;
   data indicating state and local taxes;
   data indicating real estate taxes;
   data indicating personal property tax;
   data indicating mortgage interest;
   data indicating charitable contributions;
   data indicating casualty and theft losses;
   data indicating unreimbursed employee expenses;
   data indicating an alternative minimum tax;
   data indicating a foreign tax credit;
   data indicating education tax credits;
   data indicating retirement savings contributions; and
   data indicating child tax credits.

18. A system for identifying and addressing imaging artifacts to enable a software system to provide financial services that are at least partially based on an image of a financial document, comprising:
   a system engine that receives image data for a financial document, the image data for the financial document representing an image of the financial document, the image data for the financial document including content data for the financial document representing content of the financial document,
      wherein the system engine prepares a tax return for a user at least partially based on the content of the financial document; and
   an image processing module communicatively coupled to the system engine to receive the image data for the financial document from the system engine and to provide the content data,
      wherein the image processing module generates image classification data by application of an analytics model to image features data that are extracted from the image data for the financial document,
      wherein the image processing module applies a filter to the image data for the financial document to reduce image artifact data in the image data for the financial document, if the image classification data exceeds a predetermined threshold,
      wherein the image processing module identifies the content data from the image data for the financial document.

19. The system of claim 18, wherein the analytics model includes one or more machine learning algorithms, include at least one gradient boosted decision trees.

20. The system of claim 18, wherein the image processing module extracts image features data with a feature extractor.

21. The system of claim 20, wherein the feature extractor is an ORB feature extractor.

22. A system for identifying and addressing imaging artifacts to enable a software system to provide financial services that are at least partially based on an image of a financial document, comprising:
   one or more processors; and
   a memory communicatively coupled to the one or more processors, the memory storing instructions that, when executed by the one or more processors, performs a process of identifying and addressing imaging artifacts to enable a software system to provide financial services that are at least partially based on an image of a financial document, the process including:

providing the software system;

receiving, with the software system, image data for a financial document, the image data for the financial document representing an image of the financial document;

storing the image data in one or more sections of the memory;

providing an analytics model to identify one or more imaging artifacts in the image of the financial document, the analytics model being trained with artifact imaging data representing a plurality of imaging artifacts, to enable the analytics model to identify the one or more imaging artifacts in the image of the financial document;

applying the image data for the financial document to the analytics model to generate image classification data that represents an image classification, the image classification indicating a likelihood that the image of the financial document includes the one or more imaging artifacts;

comparing the image classification data to a predetermined threshold;

if the image classification data exceeds the predetermined threshold, applying a filter to the image data to at least partially reduce the one or more imaging artifacts in the image data;

applying the image data to an optical character recognition engine to identify content data that represents content of the financial document; and populating one or more fields in a data structure maintained by the software system, with the content data, to support a financial service provided by the software system to a user, and to reduce a manual entry of the content data from the financial document by the user.

23. The system of claim 22, wherein the software system is selected from a group of software systems consisting of: a tax return preparation system; a personal finances management system; and a business finances management system.

24. The system of claim 22, wherein the one or more imaging artifacts are one or more patterns from Moiré effect.

25. The system of claim 22, wherein the one or more imaging artifacts result from capturing an image of a cathode ray tube ("CRT") computer monitor.

26. The system of claim 22, wherein the process further comprises:
using at least some of the content data to electronically prepare a tax return for the user.

27. The system of claim 22, wherein the process further comprises:
training the analytics model by applying one or more machine learning algorithms to existing image data for plurality of documents that include the one or more imaging artifacts.

28. The system of claim 27, wherein the one or more machine learning algorithms include gradient boosted decision trees.

29. The system of claim 22, wherein applying the image data for the financial document to the analytics model includes:
extracting image features data from the image data for the financial document, the image features data representing one or more image features for the financial document; and
applying the image features data to the analytics model.

30. The system of claim 29, wherein the one or more image features for the financial document include one or more of edges, corners, blobs, and ridges.

31. The system of claim 22, wherein the filter is a median filter having a window that includes a window shape and a quantity of window elements.

32. The system of claim 31, wherein applying the filter to the image data includes applying the median filter to the image data, wherein applying the median filter to the image data includes assigning a value to a central one of the quantity of window elements at least partially based on an average of values of those of the quantity of window elements that surround the central one of the quantity of window elements in the window.

33. The system of claim 31, wherein the quantity of window elements are a quantity of pixels.

* * * * *